US011120387B2

(12) United States Patent
Chanez et al.

(10) Patent No.: US 11,120,387 B2
(45) Date of Patent: Sep. 14, 2021

(54) METHOD AND APPARATUS FOR IDENTIFYING, AUTHENTICATING, TRACKING AND TRACING MANUFACTURED ITEMS

(75) Inventors: Patrick Chanez, Cheyres (CH); Alain Sager, Bossonnens (CH); Philippe Chatelain, Chavornay (CH); Erwan Fradet, Denens (CH)

(73) Assignee: PHILIP MORRIS USA INC., Richmond, VA (US)

( * ) Notice: Subject to any disclaimer, the term of this patent is extended or adjusted under 35 U.S.C. 154(b) by 308 days.

(21) Appl. No.: 12/405,791

(22) Filed: Mar. 17, 2009

(65) Prior Publication Data
US 2009/0230190 A1    Sep. 17, 2009

(30) Foreign Application Priority Data

Mar. 17, 2008    (EP) .................................... 08250926

(51) Int. Cl.
*G06F 19/00*    (2011.01)
*G06Q 30/00*    (2012.01)
(Continued)

(52) U.S. Cl.
CPC .................................. *G06Q 10/08* (2013.01)

(58) Field of Classification Search
CPC .. G06Q 10/08; G06Q 10/087; G06K 17/0029; G06K 2017/0051; G06K 19/07758; G06K 19/07771
(Continued)

(56) References Cited

U.S. PATENT DOCUMENTS 5,646,389 A * 7/1997 Bravman et al. ............. 235/385
5,848,405 A * 12/1998 Norcott ................. G06F 16/284
(Continued)

FOREIGN PATENT DOCUMENTS

EP    1 645 992 A1    4/2006
FR    2 900 486 A1    11/2007
(Continued)

OTHER PUBLICATIONS https://www.j-platpat.inpit.go.jp, Translation for JP08-069247A(1996), retrieved Jul. 2020.*
(Continued)

*Primary Examiner* — Thien T Mai
(74) *Attorney, Agent, or Firm* — Harness, Dickey & Pierce, P.L.C.

(57) ABSTRACT

A method and apparatus for identifying manufactured items in containers, where each container is suitable for containing two or more units, and where the method comprises the steps of: associating each unit with a unique unit identifier, uniquely identifying each unit, allocating two or more units to be contained in each container, uniquely identifying each container, for each container, determining one or more ranges of unit identifiers of the two or more units allocated to the container, and storing, in a database, a container identifier for each container, each container identifier being coupled, in the database, to the one or more ranges of unit identifiers of the two or more units allocated to the container. There is also provided methods and apparatus for authenticating, tracking and tracing the units.

16 Claims, 5 Drawing Sheets

(51) Int. Cl.
*G06Q 90/00* (2006.01)
*G06Q 10/08* (2012.01)

(58) Field of Classification Search
USPC ....... 235/385, 492, 462.45, 487, 462.1, 491; 340/10.42
See application file for complete search history.

(56) References Cited

U.S. PATENT DOCUMENTS

| | | | |
|---|---|---|---|
| 5,974,150 A * | 10/1999 | Kaish et al. | 713/179 |
| 6,226,619 B1 * | 5/2001 | Halperin et al. | 705/23 |
| 6,266,619 B1 | 7/2001 | Thomas et al. | |
| 6,371,375 B1 * | 4/2002 | Ackley et al. | 235/462.45 |
| 6,456,729 B1 * | 9/2002 | Moore | 235/491 |
| 6,457,137 B1 | 9/2002 | Mitchell et al. | |
| 6,547,137 B1 * | 4/2003 | Begelfer | H06K 17/0029 235/380 |
| 7,267,271 B2 * | 9/2007 | Rhea | 235/385 |
| 2001/0047340 A1 | 11/2001 | Snow et al. | |
| 2002/0130065 A1 * | 9/2002 | Bloom | B07C 3/02 209/630 |
| 2003/0061599 A1 * | 3/2003 | Bates | G06F 11/362 717/129 |
| 2004/0140362 A1 * | 7/2004 | Allen | 235/487 |
| 2004/0212480 A1 * | 10/2004 | Carrender et al. | 340/10.42 |
| 2005/0006469 A1 | 1/2005 | Nonneman et al. | |
| 2005/0127176 A1 | 6/2005 | Dickinson et al. | |
| 2006/0144940 A1 * | 7/2006 | Shannon et al. | 235/385 |
| 2007/0001006 A1 * | 1/2007 | Schuessler | G06K 7/14 235/451 |
| 2007/0024449 A1 | 2/2007 | Bilyeu et al. | |
| 2007/0203808 A1 * | 8/2007 | Sekimoto | G06Q 10/087 705/28 |
| 2008/0046263 A1 * | 2/2008 | Sager | G06K 17/00 705/50 |
| 2009/0014537 A1 * | 1/2009 | Gelbman | 235/492 |

FOREIGN PATENT DOCUMENTS

| | | |
|---|---|---|
| JP | H07-156459 A | 6/1995 |
| JP | H08-69247 A | 3/1996 |
| JP | 2001-328711 A | 11/2001 |
| JP | 2003-104562 A | 4/2003 |
| JP | 2005-60080 A | 3/2005 |
| JP | 2005-115890 A | 4/2005 |
| JP | 2005-200187 A | 7/2005 |
| JP | 2005-263472 A | 9/2005 |
| JP | 2005-316940 A | 11/2005 |
| JP | 2007-018355 A | 1/2007 |
| JP | 2007-528830 A | 10/2007 |
| KR | 10-2007-0074589 | 7/2007 |
| WO | WO 2005/083644 A1 | 9/2005 |
| WO | 2005-115890 A1 | 12/2005 |
| WO | WO 2006/038114 A1 | 4/2006 |

OTHER PUBLICATIONS

European Search Report for Application No. 08250926.6, dated Aug. 18, 2008.
Japanese Office Action dated Jun. 26, 2013 issued in corresponding Japanese Patent Application No. 2011-500071, 5 pages.
Japanese Office Action dated Jul. 31, 2014 issued in corresponding Japanese Patent Application No. 2011-500071, 4 pages.
Japanese Office Action dated Jun. 15, 2015 issued in corresponding Japanese Patent Application No. 2011-500071, 4 pages.
Korean Office Action dated Aug. 20, 2015 issued in corresponding Korean Patent Application No. 10-2010-7021590, 3 pages.
Korean Office Action dated Jun. 10, 2016 issued in corresponding Korean Patent Application No. 10-2010-7021590, 4 pages.
Office Action issued by the U.S. Patent and Trademark Office in the U.S. Appl. No. 15/617,858, dated Oct. 3, 2019, U.S. Patent and Trademark Office, Alexandria, VA. (16 pages).
Final Office Action dated Mar. 3, 2020 in U.S. Appl. No. 15/617,858.
Office Action dated Sep. 8, 2011 in Chinese Application No. 200980109671.
Office Action dated Jan. 18, 2012 in Chinese Application No. 200980109671.
Office Action dated Jul. 21, 2015 in Chinese Application No. 200980109671.
Notice of Allowance dated Dec. 25, 2015 in Chinese Application No. 200980109671.
Office Action dated Aug. 4, 2014 in Japanese Application No. 2011-500071.
Appeal Decision dated May 16, 2016 in Japanese Application No. 2011-500071.
Search Report dated Jun. 6, 2014 in European Application No. 13199447.
Communication dated Nov. 13, 2015 in European Application No. 13199447.
Summons to attend oral proceedings dated Nov. 18, 2016 in European Application No. 13199447.
Decision dated Jul. 12, 2018 in Korean Application No. 20107021590.
Communication dated Feb. 1, 2012 in European Application No. 09722519.
Summons to attend oral proceedings dated Nov. 14, 2012 in European Application No. 09722519.
Decision to refuse the application issued on Sep. 18, 2013 in European Application No. 09722519.
Office Action dated Nov. 7, 2016 in Japanese Application No. 2015205404.
Notice of Allowance dated Sep. 6, 2017 in Japanese Application No. 2015205404.
Non-Final Office Action dated Jul. 7, 2017 in U.S. Appl. No. 15/617,858.
Final Office Action dated Dec. 29, 2017 in U.S. Appl. No. 15/617,858.
Non-Final Office Action dated Oct. 17, 2018 in U.S. Appl. No. 15/617,858.
Final Office Action dated Apr. 29, 2019 in U.S. Appl. No. 15/617,858.
Non-Final Office Action dated Oct. 3, 2019 in U.S. Appl. No. 15/617,858.
Non-Final Office Action dated Nov. 13, 2020 in U.S. Appl. No. 15/617,858.
Official Notification dated Dec. 11, 2013 in Israeli Application No. 203955.
Official Notification dated Feb. 1, 2015 in Israeli Application No. 203955.
Official Notification dated Apr. 3, 2016 in Israeli Application No. 203955.
Official Notification dated Aug. 2, 2017 in Israeli Application No. 203955.
Examiner's Report dated Jun. 1, 2015 in Canadian Application No. 2,718,795.
Examiner's Report dated Jul. 26, 2016 in Canadian Application No. 2,718,795.
Office Action dated Apr. 16, 2019 in Brazilian Application No. PI0908562-9.
Office Action dated Jul. 18, 2019 in Brazilian Application No. PI0908562-9.
Office Action dated Mar. 21, 2013 in Colombian Application No. 10-128307-5.
Granted Resolution dated Aug. 29, 2013 in Colombian Application No. 10-128307-5.
Examination dated Jul. 4, 2016 in Costa Rican Application No. 11732.
First office action dated Sep. 27, 2011 in Mexican Application No. MX/a/2010/010156.
Second office action dated May 25, 2012 in Mexican Application No. MX/a/2010/010156.
Third office action dated Jan. 31, 2013 in Mexican Application No. MX/a/2010/010156.
Fourth office action dated Sep. 25, 2013 in Mexican Application No. MX/a/2010/010156.
Notice of Allowance dated Jun. 9, 2021 in U.S. Appl. No. 15/617,858.

* cited by examiner

METHOD AND APPARATUS FOR IDENTIFYING, AUTHENTICATING, TRACKING AND TRACING MANUFACTURED ITEMS

Cross-Reference to Related Applications:

This application claims priority under 35 U.S.C. § 119 to European Patent Application No. 082509266, filed on Mar. 17, 2008.

BACKGROUND OF THE DISCLOSURE

The present invention relates to methods and apparatus for identifying, authenticating, tracking and tracing manufactured items. In particular, the present invention relates to methods and apparatus for identifying manufactured items in containers, each container suitable for containing two or more units, and methods and apparatus for authenticating, tracking and tracing those units.

Contraband and counterfeiting cause significant loss of revenue to producers of traded goods and to national authorities. Moreover, the illegal sale of counterfeited goods of inferior quality is detrimental to the customer and to the manufacturer. Legally produced goods may also be illegally imported or traded, for example in order to evade taxes or national regulations. Also, this is particularly important for other products, such as pharmaceuticals. In addition, regulations are increasingly being introduced to require manufacturers and distributors to be able to track such goods as they move through a global market.

The problems of contraband and counterfeiting are particularly acute for goods subject to special taxation, for example tobacco products. The problems also exist for many other kinds of traded products carrying a strong brand value, in particular for internationally traded products, such as perfumes, alcohols, watches and luxury goods in general. So, manufacturers, customers, distributors, importers, national authorities and other authorized parties need to be able to verify easily that particular goods are genuine and to be able to track goods easily as they are transported.

Many internationally traded products, including tobacco products, are shipped worldwide in shipping cases. Each shipping case typically contains a number of smaller cartons. Each carton may contain one or more individual products or packs of products. For example, for tobacco products, each shipping case may contain 50 cartons, and each carton may contain 10 packs, and each pack may contain 20 smoking articles.

Shipping cases are usually labelled with an identification code. For example, U.S. 2008/0046263 (or WO 2006/038114), the contents of which is incorporated herein by this reference thereto, describes a method and apparatus for marking and authenticating manufactured items, in which the identification codes of cartons do not need to be centrally stored. Such an identification code may provide information regarding production, and can be used to track the shipping case as it is transported, and to authenticate the products contained within the shipping case.

In one previously proposed method, each carton packed within a shipping case is identified using a carton identifier. Each shipping case is identified using a shipping case identifier. A central database stores each carton identifier and each shipping case identifier. In the database, each carton identifier is linked to the associated shipping case identifier and each shipping case identifier is linked to the associated carton identifiers. Such a known system may be implemented at the production line. Each carton is applied with a carton identifier (either directly, or onto packaging or a label). As each carton exits the production line, the carton identifier is read. Each carton identifier is sent to a database stored on a central server. Then, a plurality of cartons is packed into a shipping case. Each shipping case is applied with a shipping case identifying label having a shipping case identifier. As each shipping case leaves the production line, the shipping case identifier is read and sent to the database. The production line monitors which cartons are packed into which shipping case, and the database can then link a shipping case identifier to the plurality of carton identifiers of the cartons packed in the shipping case. Thus, for each carton, the associated shipping case can be identified and, for each shipping case, the associated cartons can be identified. This allows individual cartons to be tracked and identified via the carton and the shipping case identification codes.

BRIEF SUMMARY OF SOME ASPECTS OF THE DISCLOSURE

There exists a need for an improved method and apparatus for identifying, authenticating, tracking and tracing manufactured items.

According to a first aspect of the invention there is provided a method for identifying manufactured items in containers, each container suitable for containing two or more units, the method comprising the steps of: associating each unit with a unique unit identifier; uniquely identifying each unit; allocating two or more units to be contained in each container; uniquely identifying each container; for each container, determining one or more ranges of unit identifiers of the two or more units allocated to the container; and storing, in a database, a container identifier for each container, each container identifier being coupled, in the database, to the one or more ranges of unit identifiers of the two or more units allocated to the container.

In the context of this invention, the term "identifying" is used to mean the classifying or categorizing of containers, units or items, for example at the production line. The identifying is carried out in order to distinguish one container, unit or item from another and to allow subsequent authentication, tracking or tracing. The term "authenticating" is used to mean the checking that a particular unit or container is authentic, that is, it has originated from a genuine source, and is not a counterfeit product. The term "tracking" is used to mean the monitoring of movement, location and time as the units and containers are transported and stored. This is particularly useful during the delivery process when units and containers may be passing through various shippers, delivery companies, importers and distributors on their way to customers. The term "tracing" is used to mean the locating of selected units or containers, for example for product recall.

The method of the invention allows individual units to be identified and tracked. This means that, even if illegal importers divide and mix the contents of containers, the items can still be tracked. Because each container identifier is linked only to ranges of unit identifiers for the units it contains, rather than to all the individual units' unit identifiers, the storage required in the database is smaller than in known systems. In prior art systems, a large number of carton identification codes must be stored for each shipping case. In the case of tobacco products, in which each shipping case typically contains 50 cartons, that requires 50 carton identification codes to be stored for each shipping case. The method of the invention allows the required data storage to be substantially reduced. In addition, it is unlikely that such prior art systems could be used for identification of each pack within a carton, as this would require even more storage: 10 pack identification codes for each carton, in addition to the carton and shipping case identification codes already stored. The method of the invention allows this, because the data storage requirements are reduced. Thirdly, in prior art systems, for authenticating the cartons, the actual carton identification code must be transmitted across a network, which may not be particularly secure. In the method of the invention, the actual carton identification code does not need to be transmitted.

Each unit may be an individual manufactured item. Alternatively, each unit may be a smaller container for manufactured items.

In one embodiment, each unit identifier comprises production details associated with the respective unit. In an alternative embodiment, each unit identifier is an encrypted version of production details associated with the respective unit. In that embodiment, preferably the identifier itself is not stored; preferably, only the production details and an encryption key used for the encryption are stored.

Preferably, the production details for each unit comprise one or more of: production location, production date, production time, and a counter value of an incremental counter.

The production details are unique to each unit. In order to achieve this, in one embodiment, the production details comprise only the counter value of the incremental counter. In an alternative embodiment, the production details comprise only the production time. However, in a preferred embodiment, the production details comprise the production location, the production date, the production time and the counter value of the incremental counter. In that embodiment, the incremental counter may be reset each time period.

The production location may comprise one or both of the production center and the specific production line, or the Code Generator Identification. The Code Generator Identification is an identifier uniquely identifying the point where the unit identifier is generated—see, for example, US 2008/0046263. The production time may be specified as accurately as desired and this will probably depend on the speed of production of the units. For example, the production time may be specified in terms of hours only. Alternatively, the production time may be specified in terms of hours and minutes. Alternatively, the production time may be specified in terms of hours, minutes and seconds.

The step of uniquely identifying each unit may comprise marking each unit with the unit identifier. Alternatively, the unit may be uniquely identified based on the unit's intrinsic properties, for example physical or chemical properties. The step of uniquely identifying each container may comprise marking each container with a container identifier. Alternatively, the container may be uniquely identified based on the container's intrinsic properties, for example physical or chemical properties.

The method may be incorporated into the production process for units and containers. The step of allocating two or more units to be contained in each container may comprise packing two or more units in a container.

In one exemplary embodiment, the container is a shipping case for tobacco products. In that embodiment, preferably, the unit is a carton for tobacco products. Each shipping case may be arranged to hold 50 cartons. Each carton may be arranged to hold 10 packs of smoking articles. Each pack may be arranged to hold 20 smoking articles. Preferably, each unit identifier is a 12-digit alphanumeric code, which is an encrypted version of the unit's production details. Preferably, each container identifier is a 40-digit number.

According to the first aspect of the invention there is also provided a method for identifying cartons of smoking articles in shipping cases, each shipping case suitable for containing 50 cartons, the method comprising the steps of: associating each carton with a unique carton identifier; uniquely identifying each carton; allocating 50 cartons to be contained in each shipping case; uniquely identifying each shipping case; for each shipping case, determining one or more ranges of carton identifiers of the 50 cartons allocated to the shipping case; and storing, in a database, a shipping case identifier for each shipping case, each shipping case identifier being coupled, in the database, to the one or more ranges of carton identifiers of the 50 cartons allocated to the shipping case.

According to a second aspect of the invention, there is provided a method for tracking a unit contained or formerly contained within a container for manufactured items identified according to the method of the first aspect of the invention, the method comprising the steps of: reading a unit identifier on the unit; and sending details of the unit identifier to a host including the database.

Preferably, the host is arranged to store the location of the unit determined from the reading of the unit identifier. Preferably, the host is arranged to store at least one previous location of the unit determined from at least one previous reading of the unit identifier. This is advantageous because the individual units can be tracked from location to location, using the unit identifiers. The host may also be arranged to store details of the movement of the unit, for example the route taken by the unit between locations, the time the unit was to be found at a particular location, and other details useful for tracking.

Preferably, the method further comprises the step of receiving, from the host, details of the at least one previous location of the unit. The method may further comprise the step of receiving, from the host, details of the movement of the unit.

Preferably, the host is arranged to determine, from the received unit identifier, the range in which falls the unit identifier of the unit and, hence, the container containing or formerly containing the unit, and preferably the host is arranged to store at least one location of the container containing or formerly containing the unit. The host may also be arranged to store details of the movement of the container containing or formerly containing the unit, for example the route taken by the container between locations, the time the container was to be found at a particular location, and other details useful for tracking.

Preferably, the method further comprises the step of receiving, from the host, details of the at least one location of the container containing or formerly containing the unit. The method may further comprise the step of receiving, from the host, details of the movement of the container containing or formerly containing the unit.

According to the second aspect of the invention, there is also provided a method for tracking a container for manufactured items identified according to the method of the first aspect of the invention, the method comprising the steps of: reading a container identifier on the container; and sending details of the container identifier to a host including the database.

According to a third aspect of the invention, there is provided a method for authenticating a unit contained or formerly contained within a container for manufactured items identified according to the method of the first aspect of the invention, the method comprising the steps of: reading a unit identifier on the unit; and sending details of the unit identifier to a host including the database.

Preferably, the host is arranged to determine, from the received unit identifier, the range in which falls the unit identifier of the unit and, hence, the container containing or formerly containing the unit. This is advantageous because the individual units can be authenticated, using the unit identifiers, as originating from a genuine container. If the unit identifier cannot be recognized or cannot be matched to a container, there may be a supposition that the unit is not genuine.

Preferably, the method further comprises the step of receiving from the host, confirmation that the unit is authentic. The confirmation may include an indication of the container containing or formerly containing the unit.

According to the third aspect of the invention, there is also provided a method for authenticating a container for manufactured items identified according to the method of the first aspect of the invention, the method comprising the steps of: reading a container identifier on the container; and sending details of the container identifier to a host included in the database.

According to a fourth aspect of the invention, there is provided a method for tracing units contained within a container for manufactured items identified according to the method of the first aspect of the invention, the method comprising the steps of: determining the unit identifiers of the units to be traced; determining, from those unit identifiers, the one or more ranges of unit identifiers in which fall those unit identifiers; determining, from those ranges, the container or containers containing the units to be traced; and locating the determined container or containers.

The step of locating the determined container or containers may comprise reading, from a database, delivery and destination details for the container or containers.

According to the first aspect of the invention, there is also provided apparatus for identifying manufactured items in containers, each container suitable for containing two or more units, each unit being associated with a unique unit identifier, the apparatus comprising: means for uniquely identifying each unit; means for allocating two or more units to be contained in each container; means for uniquely identifying each container; means for determining one or more ranges of unit identifiers of the two or more units allocated to the container; and a database for storing a container identifier for each container, each container identifier being coupled, in the database, to the one or more ranges of unit identifiers of the two or more units allocated to the container.

Because each container identifier is linked only to ranges of unit identifiers for units it contains, rather than to all the individual units' identifiers, the data storage requirements are smaller than in known systems.

In one embodiment, each unit identifier comprises production details associated with the respective unit. In an alternative embodiment, each unit identifier is an encrypted version of production details associated with the respective unit. In that embodiment, preferably the identifier itself is not stored; preferably, only the production details and an encryption key used for the encryption are stored.

Preferably, the production details for each unit comprise one or more of: production location, production date, production time, and a counter value of an incremental counter. The production details are unique to each unit. In order to achieve this, in one embodiment, the production details comprise only the counter value of the incremental counter.

In an alternative embodiment, the production details comprise only the production time. However, in a preferred embodiment, the production details comprise the production location, the production date, the production time and the counter value of the incremental counter. In that embodiment, the incremental counter may be reset each time period.

The means for uniquely identifying each unit may comprise means for marking each unit with the unit identifier. The means for uniquely identifying each container may comprise means for marking each container with the container identifier.

The apparatus may be incorporated into the production apparatus for units and containers. The means for allocating two or more units to be contained in each container may comprise means for packing two or more units in a container.

According to the first aspect of the invention, there is also provided apparatus for identifying cartons of smoking articles in shipping cases, each shipping case suitable for containing 50 cartons, each carton being associated with a unique carton identifier, the apparatus comprising: means for uniquely identifying each carton; means for allocating 50 cartons to be contained in each shipping case; means for uniquely identifying each shipping case; means for determining one or more ranges of carton identifiers of the 50 cartons allocated to the shipping case; and a database for storing a shipping case identifier for each shipping case, each shipping case identifier being coupled, in the database, to the one or more ranges of carton identifiers of the 50 cartons allocated to the shipping case.

According to the second aspect of the invention, there is also provided apparatus for tracking and authenticating a unit contained or formerly contained within a container for manufactured items identified according to the method of the first aspect of the invention, the apparatus comprising: a reader for reading a unit identifier on the unit; and a transmitter for sending details of the unit identifier to a host including the database.

Preferably, the apparatus further comprises a receiver for receiving messages from the host.

According to the invention, there is also provided a container for manufactured items identified according to the method of the first aspect of the invention. According to the invention, there is also provided a container identifier for such a container. According to the invention, there is also provided a unit contained or formerly contained within a container for manufactured items identified according to the method of the first aspect of the invention. According to the invention, there is also provided a unit identifier for such a unit.

Features described in relation to one aspect of the invention may also be applicable to another aspect of the invention.

BRIEF DESCRIPTION OF THE DRAWINGS

The invention will be further described, by way of example only, with reference to FIGS. 1 to 5, wherein like reference numerals are applied to like elements and wherein:

FIG. 1 shows a shipping case 103 having an identifying label 105. Each shipping case 103 is suitable for containing two or more cartons 101. Each carton has a carton identifier 101a. In this exemplary embodiment, the shipping case identifying label 105 comprises two portions: a machine-readable shipping case identifier 107 and a human-readable shipping case identifier 109.

Figure 1:
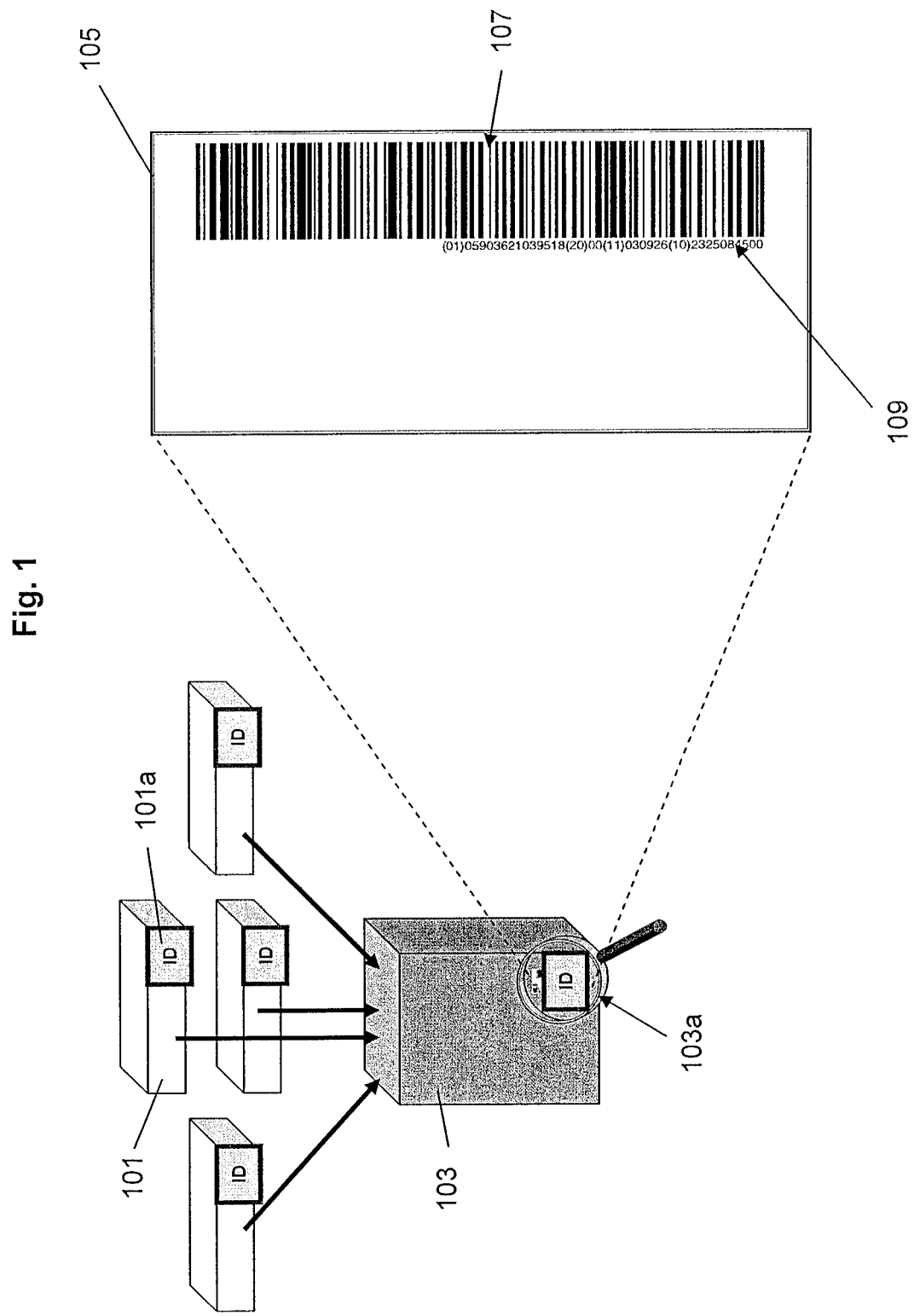
FIG. 1 is a schematic view shows a shipping case having an identifying label including a shipping case identifier.

In this embodiment, the human-readable shipping case identifier 109 is a 40 digit number. The 40 digit number is encoded into an EAN-128 (also known as GS1-128) barcode which forms the machine-readable shipping case identifier 107. The identifier 109, and hence the identifier 107, are unique for each particular shipping case 103. In this embodiment, the identifiers 107 and 109 typically identify information including, but not limited to, the production date (YYMMDD), the production time (HHMMSS), the production center, and the case packer number. The customer recipient of the shipping case may also be identified if already known. Since the identifiers 107 and 109 identify the same information, but simply have a different form, they will be referred to generically as shipping case identifier 103a.

As discussed above, the shipping case identifying label can be used for tracking the shipping case. For example, a customer order may be linked to the identifying label or labels of the particular shipping case or cases containing the ordered goods. This allows the customer, the manufacturer and any intermediaries to constantly track the location of the required goods. This may be achieved using scanners for scanning the identifiers 103a and communicating with a central database. Alternatively, the identifiers can be read by a human, who can then manually communicate with a central database.

The shipping case identifying label may also be used by customers, national authorities and other parties, to verify that a particular shipping case contains genuine articles. For example, a party may use a scanner to read the identifier 103a on a shipping case (or the identifier can be read by a human, as discussed above). The identifier details may be sent to the central database. The central database can then lookup the identifier details, determine the shipping case production details and send those details to the scanner, thereby allowing the party to verify the shipping case, and the products contained therein, as genuine. In the event that the central database does not recognize the identifier, the party may suppose that the articles in question are counterfeit.

The shipping case identifying label may also be used for tracing shipping cases. For example, if the manufacturer needs to recall the products from a selected number of shipping cases, those shipping cases can be traced using their identifying labels.

As discussed previously, a method has already been proposed to link the shipping case identifier to the cartons contained within the shipping case. In that method, each carton identifier may be a 12-digit alphanumeric code. On the carton itself, the 12-digit alphanumeric code may be coded into a 2D barcode in the form of a datamatrix. The 12-digit code may also be printed onto the carton. As already mentioned, each shipping case identifier may a 40-digit number.

Thus, for that system, data storage in the database might be as shown in Table 1.

TABLE 1

| CARTON IDENTIFIER 101a | SHIPPING CASE IDENTIFIER 103a |
|---|---|
| L73Q2M5JQC47 | 0107623900507450200411071123100215222123 |
| 7S6UAJBL3U62 | 0107623900507450200411071123100215222123 |
| 4XJLKTND82CH | 0107623900507450200411071123100215222123 |
| CSY6KVHK4MTC | 0107623900507450200411071123100215222123 |
| C6SY9V53CXB6 | 0107623900507450200411071123100215222123 |
| HVD31USQ0U0V | 0107623900507450200411071123100215222123 |
| DBJ2UBX5RWCC | 0107623900507450200411071123100215222123 |
| ELQU4CJNAL57 | 0107623900507450200411071123100215222123 |
| PWA2E2TZYCWK | 0107623900507450200411071123100215222123 |
| 9UB9ASGG20F6 | 0107623900507450200411071123100215222123 |
| U26V5VKG8WCH | 0107623900507450200411071123100215222123 |
| . . . | . . . |

Thus, each carton identifier 101a (in this case a 12-digit alphanumeric code) is linked to the identifier 103a of the shipping case (in this case a 40-digit number) to which it is allocated. Each shipping case identifier 103a is, in turn, linked to the carton identifiers 101a of all the cartons contained in the shipping case.

Consider the above described example used for tobacco products. In this case, each shipping case 103 contains 50 cartons 101. Each shipping case 103 has an identifier 103a which comprises a 40 digit code. In one example, because of repetition of certain digits and redundancy of certain digits (at least for this purpose), this can be compacted into 8 bytes of storage. Each carton 101 has an identifier 101a which comprises a 12-digit alphanumeric code. Each alphanumeric digit requires 1 byte of storage. So each, carton identifier 101a requires 12 bytes of storage. Thus, each shipping case requires 50×(12+8)=1000 bytes≈1 kilobyte of storage (since the 40 digit code is stored for every alphanumeric code). Given the huge numbers of smoking articles produced worldwide, the database size required will be enormous.

In the present invention, the required data storage is considerably reduced.

In an embodiment, each carton identifier is an encrypted version of the following information: the code generator ID that generates the code, the production date and time, and an incremental counter reset at the start of each minute (see, for example, U.S. 2008/0046263, already mentioned). That is, in this embodiment, each carton identifier is an encrypted version of production details of the respective carton. Thus, the carton identifier information might be as shown in Table 2.

TABLE 2

| CARTON IDENTIFIER | CODE GENERATOR ID | PRODUCTION DATE & TIME | COUNTER |
|---|---|---|---|
| . . . | . . . | . . . | . . . |
| L73Q2M5JQC47 | 116 | 23/11/2007 10:11 | 86 |
| 7S6UAJBL3U62 | 116 | 23/11/2007 10:11 | 87 |
| 4XJLKTND82CH | 116 | 23/11/2007 10:11 | 88 |
| CSY6KVHK4MTC | 116 | 23/11/2007 10:11 | 89 |
| C6SY9V53CXB6 | 116 | 23/11/2007 10:11 | 90 |
| HVD31USQ0U0V | 116 | 23/11/2007 10:12 | 1 |
| DBJ2UBX5RWCC | 116 | 23/11/2007 10:12 | 2 |
| ELQU4CJNAL57 | 116 | 23/11/2007 10:12 | 3 |
| PWA2E2TZYCWK | 116 | 23/11/2007 10:12 | 4 |
| 9UB9ASGG20F6 | 116 | 23/11/2007 10:12 | 5 |
| U26V5VKG8WCH | 116 | 23/11/2007 10:12 | 6 |
| . . . | . . . | . . . | . . . |

The carton identifier may be, as discussed in U.S. 2008/0046263, a unique identification code SUPI obtained by processing data in a Production Information Code PIC. The PIC combines various data related to the manufacture of the item, such as a code MC identifying a manufacturing centre, a code PL identifying a particular production line within a manufacturing centre, and codes YR, DY, HR identifying the year, day and hour, respectively, when a particular item was manufactured. In one alternative embodiment, the PIC may include a code generator ID instead of the manufacturing centre and production line codes MC, PL.

To obtain the PIC, the individual data elements can be combined by decimal or binary digit juxtaposition, by algebraic composition, by applying a predefined shift value each data element and adding all the shifted values together, or by any other computational means. Preferably the composition function is invertible, to allow decomposition of the PIC into the original elements MC, PL, YR, DY, I-IR. In the case of a non-reversible composition function, an additional element may be introduced into the PIC to ensure uniqueness.

During each production hour, a production line fabricates a large number of items. Each item is identified, within a production hour, by an individual number TI, for example a progressive number corresponding to the chronological production sequence. Other manners of generating or assigning individual numbers are possible.

The production information code PIC and the individual number TI are combined to provide an item identifier UPI. In the following description, each UPI is unique to an item, for example to a single cigarette pack or cigarette carton. However the invention is not limited to this case, and includes variants with non-unique UPI numbers, distinguishable from each other by their different digital signatures.

In more detail, at each production line at the beginning of each production batch, the code generator generates a random salt index alpha, which is transmitted to a checking centre, with various information related to the item to be manufactured such as, for example, brand, intended market of destination, packaging. A new salt index alpha is generated at every change of production batch. Preferably the checking centre acknowledges successful receipt of the index alpha to the code generator. The index alpha may be regarded as a dynamic secret code.

In an embodiment, the UPI code of the first item to be produced in the batch is transmitted with the index alpha to the checking centre. The salt index alpha is stored in a database related to various information about the item to be manufactured. This enables the checking centre, upon receipt of a request to check a particular SUPI code, to retrieve the particular alpha and knowing the salt matrix used by the code generator to sign that SUPI code, validate the signature.

The random salt index alpha, the salt matrix and the UPI code are used by the code generator for generating a noise code, which is safe from cryptographic attacks. It does not allow the reconstruction of the original values of alpha, salts matrix and UPI. A variety of known techniques are available for generating the noise code including, but not limited to, table substitution, indexing, hashing, and variations thereof.

The noise code so generated is unequivocally calculated from the UPI, yet the inverse operation is computationally impossible.

The noise code is used as a digital signature, allowing validation of the UPI code. Preferably the alpha code and the salt matrix are combined in a different way for each manufactured item, in order to render the digital signatures robust against decryption attempts.

The salt matrix and the alpha code are known only by the code generator and by the checking centre. Together they constitute a secret allowing the code generator to generate signed codes which the checking centre can subsequently verify.

The UPI number and the calculated noise code are combined and, preferably, the resulting code is obfuscated, destroying correlations between successive codes. The obfuscation operation is reversible, allowing the checking centre to retrieve the original UPI and noise value. Several known obfuscation techniques are possible. The particular obfuscation algorithm chosen is preferably not published.

The result of the obfuscation is the unique SUPI code or item (carton) identifier, which is printable on a manufactured item.

Note that Table 2 shows the connection between the encrypted carton identifier and the production details. Since, in this embodiment, the carton identifier is the production details, in encrypted form, there is no need to store both the carton identifier and the production details, as long as the key used for encryption is known (see, for example, U.S. 2008/0046263, already mentioned). Thus, Table 2 does not represent what is actually stored in the database.

Because of the counter, the production details for each carton are unique, even if several cartons are produced each minute.

Each carton is then allocated to a shipping case. Depending on which cartons are allocated to a shipping case, ranges of the production details of the cartons allocated are defined. For example, if the 11 cartons identified in Table 2 are all allocated to a single shipping case, two ranges are defined. The first range will be cartons produced on date 23 Nov. 2007, at time 10:11 on the Code Generator 116, having Counters 86 to 90. This will cover the first five cartons. The second range will be cartons produced on date 23 Nov. 2007, at time 10:12 on the Code Generator 116, having Counters 1 to 6. This will cover the final six cartons. Thus, for a shipping case containing these eleven cartons, only two ranges would need to be stored, as shown in Table 3.

TABLE 3

| SHIPPING CASE IDENTIFIER | CODE GENERATOR ID | PRODUCTION DATE & TIME | FROM COUNTER | TO COUNTER |
|---|---|---|---|---|
| 010 . . . 123 | 116 | 23/11/2007 10:11 | 86 | 90 |
| 010 . . . 123 | 116 | 23/11/2007 10:12 | 1 | 6 |

Because the production details for each carton are unique, each range defines a precise range of cartons. In this case, the production details are unique because, for cartons produced within the same minute, the incremental counter is different, and the incremental counter is reset each minute.

As will be discussed further below, on average a shipping case will contain two ranges of cartons, if the production details and ranges are suitably defined. As before, each shipping case identifier requires 8 bytes of storage (in one embodiment in which certain digits are repeated or redundant). The production date and time requires 2 bytes of storage, the Code Generator ID requires 4 bytes of storage, the From Counter requires 1 byte of storage and the To Counter requires 1 byte of storage. Thus, each range requires 8 bytes of storage. Thus, each shipping case on average requires 2×(8+8)=32 bytes of storage. Compared to the previous system, this has reduced the storage required from 1000 bytes to 32 bytes: a vast reduction.

Figure 2:
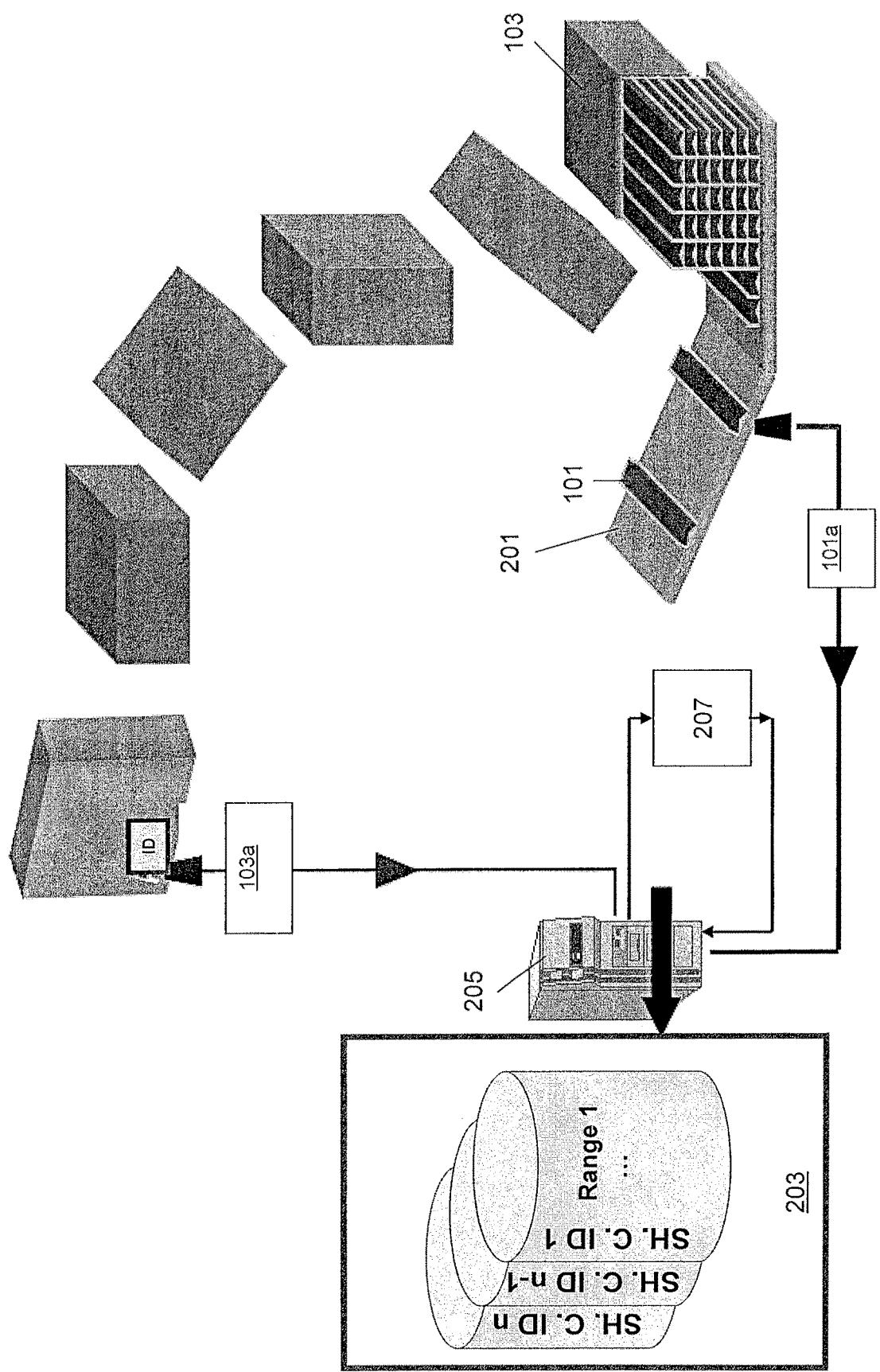
FIG. 2 schematically shows an embodiment of the method of the invention, for applying carton identifiers and shipping case identifiers at the production line.

FIG. 2 shows an exemplary method for implementing this embodiment of the invention at the production line. Each carton 101 is applied with a carton identifier 101a (either directly or onto packaging or a label). As each carton 101 exits the production line 201, the carton identifier 101a is read. Each identifier 101a (or more likely the production details associated therewith) is sent to a database 203 stored on central server 205.

Then, a plurality of cartons 101 are packed into a shipping case 103. Each shipping case 103 is applied with a shipping case identifier 103a. As each shipping case leaves the production line, the identifier 103a is read and sent to the database 203. The production line monitors which cartons are allocated to which shipping case. Once the cartons associated with the shipping case have been established, one or more ranges of production details can be stored for that shipping case. That is, at 207, for each shipping case identifier, the ranges are identified and stored. Thus, in the database, a shipping case identifier 103a is linked to the appropriate range or ranges of the production details of the cartons packed in the shipping case. The number of ranges required in certain circumstances, will be discussed further below.

Once the shipping cases and cartons have been identified as described with reference to FIG. 2, individual cartons can be authenticated, tracked and traced as will now be described.

A customer, distributor, national authority or other authorized party can read the identifier on a carton 101. This carton identifier 101a can then be sent to the central database 203. From the database, the associated shipping case can be identified. This can be used to authenticate that the carton is genuine and has indeed originated from a genuine source and was originally packed into a genuine shipping case. Of course, if the carton identifier is not recognizable, or if it cannot be linked to a shipping case, the supposition may be that the carton is counterfeit. In addition, for tracking purposes, the location of the carton can be stored when the carton identifier is sent to the database 203 and this data can be used to track the movement of the carton, for example, the route taken by the carton. That information can also be used for tracing individual cartons, for example for product recall.

Three examples of particular circumstances, in which the invention may be applied, will now be described.

EXAMPLE 1

Figure 3:
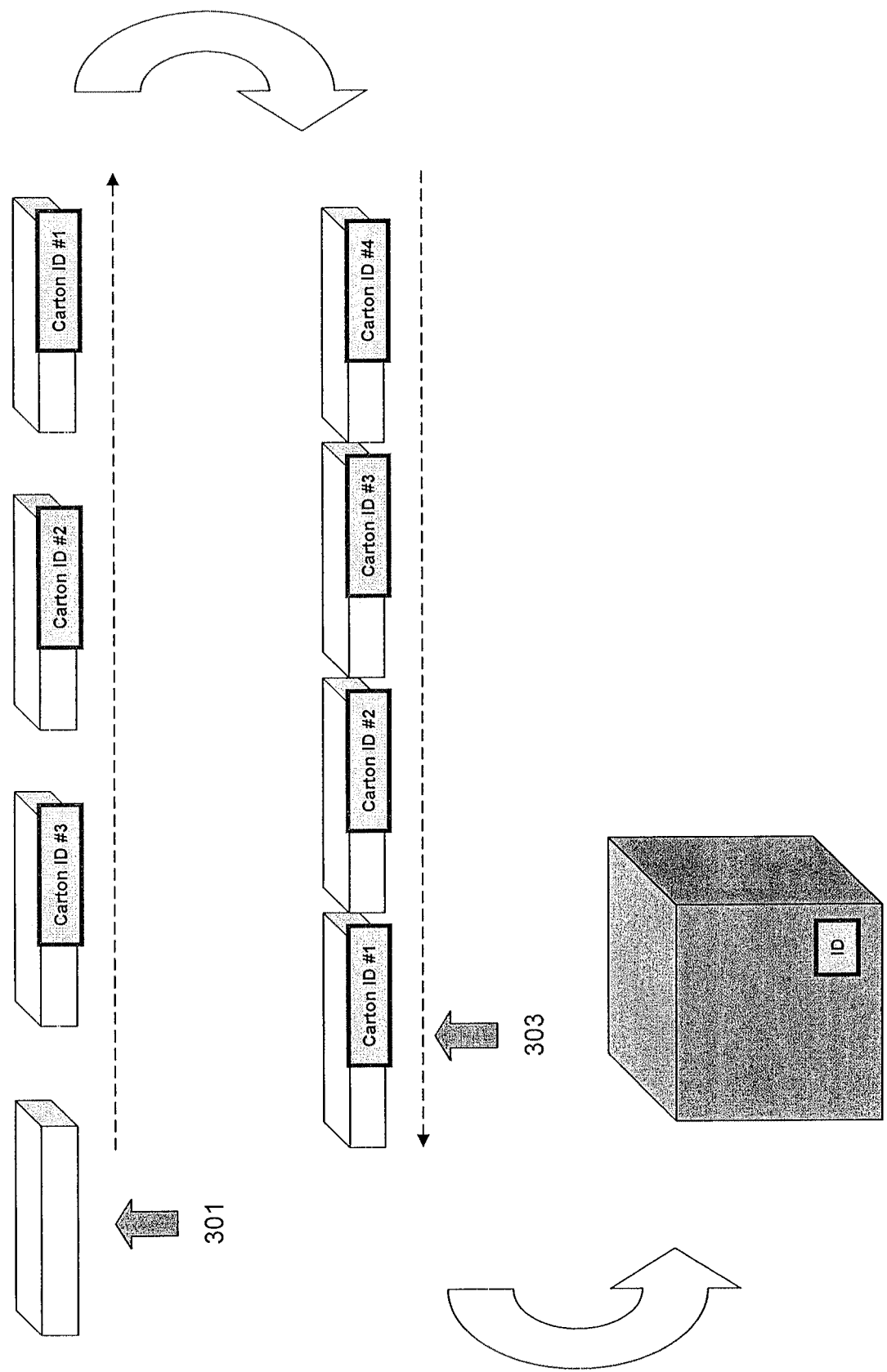
FIG. 3 schematically shows a first example of carton production in which the invention may be implemented.

Example 1, illustrated schematically in FIG. 3, is an example in which individual cartons exiting the production line are packed into a shipping case in the same order in which the carton identifiers were applied. Carton identifiers are applied at 301 and read at 303.

Within the context of this example, the case when 50 cartons are packed into a shipping case is now discussed. If at least 50 cartons are produced each minute (i.e. there are at least 50 counter values for each minute of production), each shipping case will only need to be linked to 1 or 2 ranges. If all the cartons in the shipping case are produced in the same time period, the shipping case will be linked to only a single range of production details. If the cartons are produced across two time periods, two ranges will be required in this example. If fewer cartons are produced each time period, of course more ranges will be required, requiring more storage. Thus, the precision of the time period can be chosen depending on the rate of production, to minimize the storage required.

Referring to the storage requirements discussed above, if each shipping case references a single range, this will only require 16 bytes of storage. Even if each shipping case reference two ranges, this will only require 32 bytes of storage. This is a vast improvement on storage requirements in the prior art.

EXAMPLE 2

Figure 4:
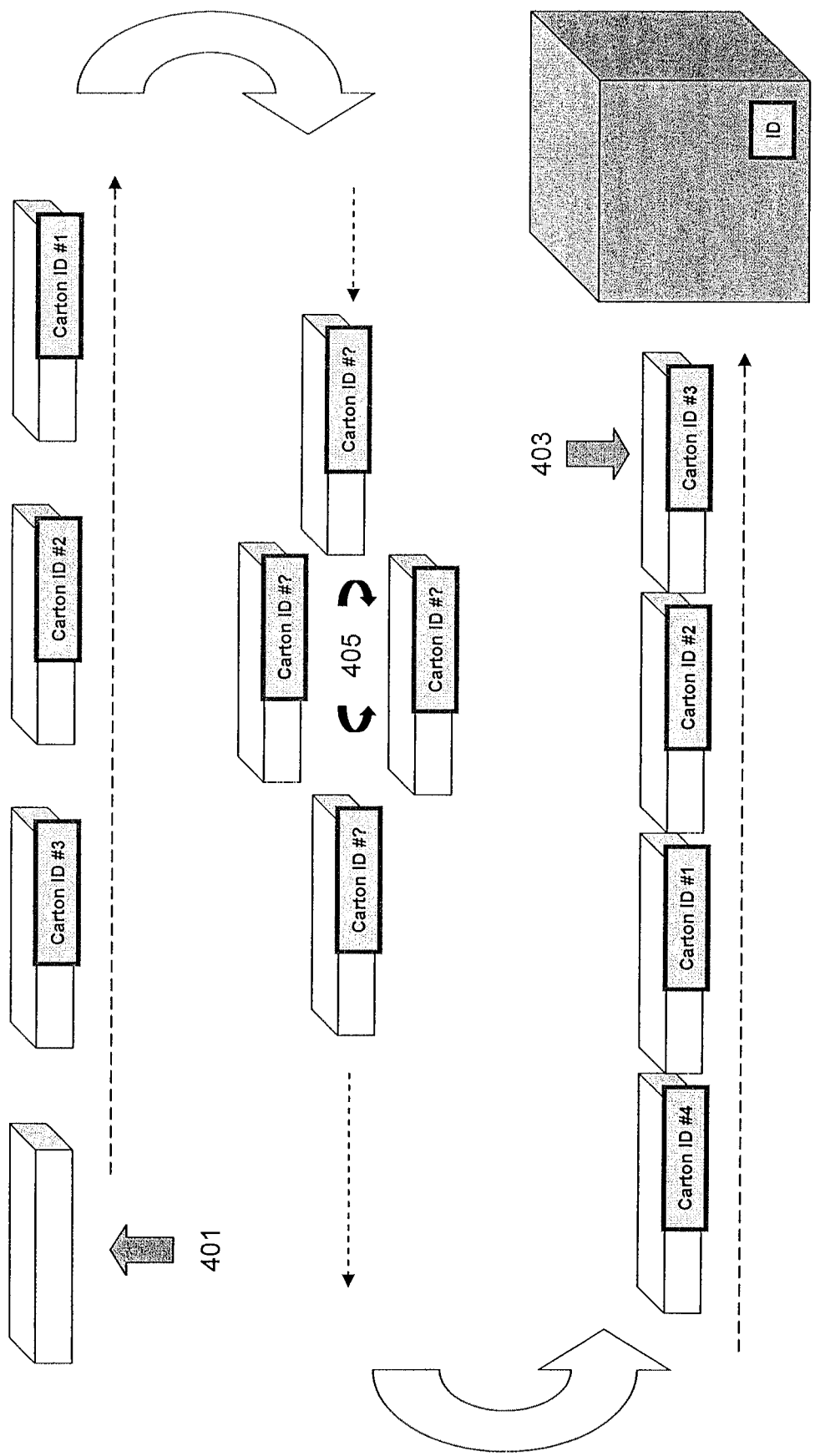
FIG. 4 schematically shows a second example of carton production in which the invention may be implemented.

Example 2, illustrated schematically in FIG. 4, is an example in which the cartons exiting the production line are mixed up before being packed into a shipping case. Carton identifiers are applied at 401 and read at 403. The cartons are mixed at 405. This means that cartons having consecutive carton identifiers are not packed into the shipping case consecutively. This is a realistic example, since individual cartons may well be removed for quality checks, and buffers, which reorder the cartons, may be provided between production lines and packing or between stages in the production line.

Within the context of this example, the case when 50 cartons are packed into a shipping case is now discussed. In many situations, no change to the ranges will be required. For example, for four cartons 1, 2, 3 and 4, if cartons 2 and 3 are swapped, the original range will still be valid, because cartons 1 to 4 will still all be included in the shipping case. However, if cartons are removed completely, or the cartons are mixed up more substantially, a new range may need to be started. In the worst case scenario, that is, with maximum mixing, each shipping case will need to reference 50 ranges. This corresponds to each carton in the shipping case falling within a separate range (that is, a separate minute of production or non-consecutive counter values within the same minute). However, less mixing is likely and the shipping case may then reference a small number (but greater than one) of ranges.

Referring to the storage requirements discussed above, even if each shipping case references 50 ranges, this will still only require 50×(8+8)=800 bytes of storage. This is less than the 1000 bytes required in the prior art. And, in most circumstances, the number of ranges required will be less than 800 bytes.

EXAMPLE 3

Figure 5:
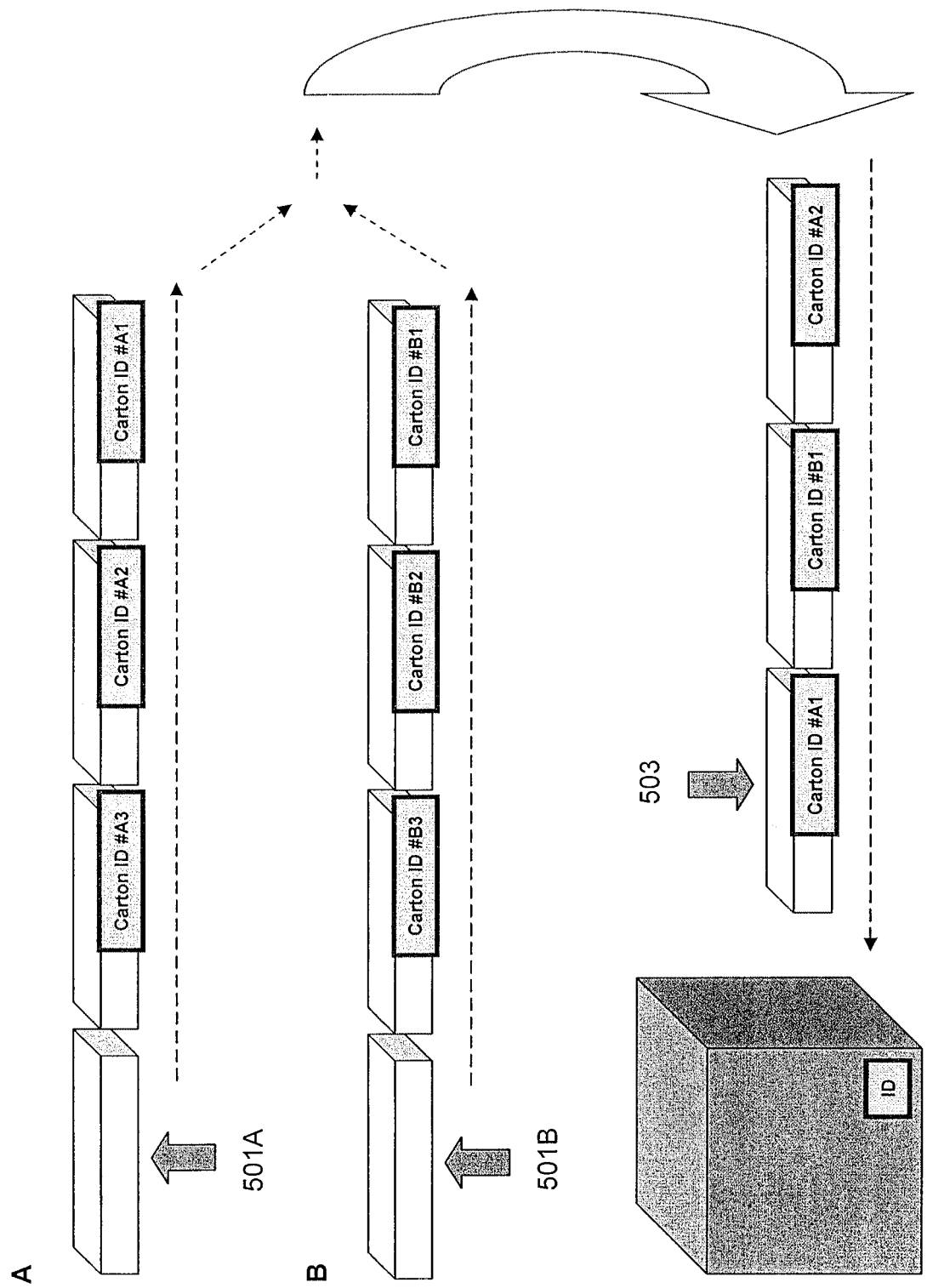
FIG. 5 schematically shows a third example of carton production in which the invention may be implemented.

Example 3, illustrated schematically in FIG. 5, is an example in which a shipping case contains cartons from two separate production lines, A and B. Carton identifiers are applied at 501A and 501B, for production lines A and B respectively, and read at 503. Without any mixing, this will require the shipping case to reference at least two ranges: one from production line A and one from production line B. Even with maximum mixing, the shipping case will only need to reference a maximum of 50 ranges as in Example 2.

Referring to the storage requirements discussed above, if the shipping case references a range from Production Line A and a range from Production Line B, this will require 32 bytes of storage. On the other hand, if the shipping case reference 50 ranges, some from Production Line A and some from Production Line B, this will required 800 bytes of storage, still less than prior art requirements. In practice, the amount of storage will be somewhere between these two values.

In the above description, examples have been used in which each shipping case contains 50 cartons, but the shipping case could contain any number of cartons. The unique identifiers—in the described examples, production details—can be defined appropriately depending on the number of cartons to be packed in each shipping case and the rate of production, so as to minimize data storage requirements. The principle could also be applied to cartons and packs, rather than shipping cases and cartons. The principle could also be applied to pallets and shipping cases. In fact, the principle may be applied where any items are stored in or on containers, each of which contains more than one item or smaller containers of items.

The invention provides a number of advantages. Firstly, as already discussed, the amount of data storage required is considerably smaller than the data storage required in prior art systems. Secondly, the reduced data storage requirements mean that the system of the invention could easily be applied to identification of smaller items, for example each pack of smoking articles within a carton or even each smoking article within a pack, without excessive storage requirements. Finally, the carton identifier only needs to be transmitted through a network when it is being checked. At all other times, only the range or the key of the encrypted range, needs to be transmitted, and not the carton identifier itself. This means that the system is potentially more secure.

The invention claimed is:

1. A method for authenticating manufactured items stored in a shipping container, wherein an amount of identifying information for the manufactured items produced on a production line and stored in the shipping container establishes a first storage requirement for a database, and the identifying information for each respective manufactured item includes a unique item identification code for the respective manufactured item and an instance of a shipping container identification code for the shipping container, the method comprising:
  generating, at a processing device, the unique item identification code for each respective manufactured item, the unique item identification code being an encrypted version of first production details for the respective manufactured item, and the first production details including a product information code and a counter value indicative of a production run of the production line that produced the respective manufactured item, wherein the unique item identification code for the respective manufactured item is generated by
    combining the product information code and the counter value to obtain an item identifier for the respective manufactured item,
    combining the item identifier with a noise code to obtain a resulting code, the noise code being generated based on a dynamic secret code and a static code matrix, and
    obfuscating the resulting code to obtain the unique item identification code for the respective manufactured item;
  marking, via a marking device, each of the manufactured items produced on the production line with a corresponding one of the unique item identification codes;
  storing, in a database, the shipping container identification code in association with each of two or more ranges of first production details for the manufactured items produced on the production line, wherein
    each of the two or more ranges of first production details are defined by the first production details of a first manufactured item and a last manufactured item from among each of the two or more ranges of first production details for the manufactured items,
    the two or more ranges of first production details are non-sequential ranges of first production details,
    the shipping container identification code is linked with the two or more ranges of first production details using only the first production details of a first manufactured item and a last manufactured item from among each of the two or more ranges of first production details for the manufactured items, and
    an amount of data associated with the shipping container identification code and the two or more ranges of first production details establish a second storage requirement for the database, the second storage requirement being smaller than the first storage requirement;
  performing, in the processing device, a decryption operation on a received unique item identification code of a remote manufactured item using a stored encryption key to obtain first production details for the remote manufactured item
  determining, in the processing device, whether the first production details for the remote manufactured item fall within one of the two or more ranges of first production details; and
  identifying, in the processing device, the remote manufactured item as a counterfeit item in response to determining that the first production details for the remote manufactured item do not fall within one of the two or more ranges of first production details.

2. The method of claim 1, wherein the counter value for each respective manufactured item produced at the same time during the same production run is different.

3. The method according to claim 1, wherein the product information code includes at least one of production location, production date or production time.

4. The method according to claim 1, the method further comprising:
  reading the unique item identification code on a marked manufactured item among the manufactured items produced on the production line.

5. The method according to claim 4, further comprising:
  storing a location of the marked manufactured item determined from the reading of the unique item identification code on the marked manufactured item.

6. The method according to claim 1, the method further comprising:
  reading the unique item identification code on a marked manufactured item among the manufactured items produced on the production line as the marked manufactured item leaves the production line.

7. The method according to claim 1, the method further comprising:
  identifying a range among the two or more ranges of first production details including the first production details for the remote manufactured item;
  identifying the shipping container from the range among the two or more ranges of first production details; and
  locating the shipping container.

8. The method according to claim 1, wherein the manufactured items are cartons for tobacco products.

9. The method according to claim 1, wherein the manufactured items are cartons arranged to hold smoking articles.

10. The method according to claim 1, wherein
the two or more ranges of first production details are allocated a specified number of bytes of memory; and
the specified number of bytes of memory is less than a specified number of bytes in a memory storing the unique item identification code for each of the manufactured items in association with a separate instance of the shipping container identification code for the shipping container.

11. The method according to claim 10, wherein each range of first production details uses no more than 16 bytes of storage space.

12. A system for authenticating manufactured items stored in a shipping container, the system comprising:
a database having a first storage requirement based on an amount of data associated with identifying information for the manufactured items, the identifying information for each respective manufactured item including a unique item identification code for the respective manufactured item, and an instance of a shipping container identification code for the shipping container;
a first processing device configured to
generate the unique item identification code for each respective manufactured item, the unique item identification code being an encrypted version of first production details for the respective manufactured item, and the first production details including a production information code and a counter value indicative of a production run of a production line that produced the respective manufactured item, wherein the unique item identification code for the respective manufactured item is generated by
combining the product information code and the counter value to obtain an item identifier for the respective manufactured item,
combining the item identifier with a noise code to obtain a resulting code, the noise code being generated based on a dynamic secret code and a static code matrix, and
obfuscating the resulting code to obtain the unique item identification code for the respective manufactured item,
store, in the database, the shipping container identification code in association with each of two or more ranges of first production details for the manufactured items produced on the production line,, wherein
each of the two or more ranges of first production details are defined by the first production details of a first manufactured item and a last manufactured item from among each of the two or more ranges of first production details for the manufactured items,
the two or more ranges of first production details are non-sequential ranges of first production details, the shipping container identification code is linked with the two or more ranges of first production details using only the first production details of a first manufactured item and a last manufactured item from among each of the two or more ranges of first production details for the manufactured items, and
an amount of data associated with the shipping container identification code and the two or more ranges of first production details establish a second storage requirement for the database, the second storage requirement being smaller than the first storage requirement; and
a second processing device configured to
perform a decryption operation on a received unique item identification code of a remote manufactured item using a stored encryption key to obtain first production details for the remote manufactured item,
determine whether the first production details for the remote manufactured item fall within one of the two or more ranges of first production details, and
identify the remote manufactured item as a counterfeit item in response to determining that the first production details for the remote manufactured item do not fall within one of the two or more ranges of first production details.

13. The system according to claim 12, wherein the manufactured items are cartons for tobacco products.

14. The system according to claim 12, wherein the manufactured items are cartons arranged to hold smoking articles.

15. The system according to claim 12, wherein
the two or more ranges of first production details are allocated a specified number of bytes of memory; and
the specified number of bytes of memory is less than a specified number of bytes in a memory storing the unique item identification code for each of the manufactured items in association with a separate instance of the shipping container identification code for the shipping container.

16. The system according to claim 15, wherein each range of first production details uses no more than 16 bytes of storage space.

* * * * *